US006282045B1

(12) United States Patent
Glover

(10) Patent No.: US 6,282,045 B1
(45) Date of Patent: *Aug. 28, 2001

(54) SERVER HARD DISK DRIVE INTEGRATED CIRCUIT AND METHOD OF OPERATION

(75) Inventor: Kerry C. Glover, Wylie, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,994

(22) Filed: Sep. 15, 1997

(51) Int. Cl.$^7$ .............................. G11B 5/09; G11B 21/02; G11B 27/10

(52) U.S. Cl. .......................................... 360/73.03; 360/75

(58) Field of Search ................................. 360/39, 46, 65, 360/71, 72.1, 73.01, 73.03, 75, 77.01, 77.07, 77.11, 78.01, 78.04, 78.14; 711/100, 101, 111, 112

(56) References Cited

U.S. PATENT DOCUMENTS

| 5,341,249 | | 8/1994 | Abbott et al. ........................ 360/46 |
|---|---|---|---|
| 5,416,646 | * | 5/1995 | Shirai ..................................... 360/46 |
| 5,422,760 | * | 6/1995 | Abbott et al. ........................ 360/46 |
| 5,430,584 | * | 7/1995 | Petersen ................................ 360/48 |
| 5,450,253 | * | 9/1995 | Seki et al. ............................. 360/65 |
| 5,465,343 | * | 11/1995 | Henson et al. ..................... 395/439 |
| 5,559,983 | * | 9/1996 | Masood ............................... 395/439 |
| 5,586,306 | | 12/1996 | Romano et al. ..................... 711/112 |
| 5,801,896 | * | 9/1998 | Freitas ............................... 360/77.08 |
| 5,860,089 | * | 1/1999 | Ishii ..................................... 711/112 |
| 5,978,426 | * | 11/1999 | Glover et al. ......................... 360/51 |
| 5,999,355 | * | 12/1999 | Behrens et al. ....................... 360/65 |

FOREIGN PATENT DOCUMENTS 08129821   5/1996  (JP) .

OTHER PUBLICATIONS

Lyle J. Fredrickson, "Viterbi Detection of Matched Spectral Null Codes for PR4 Systems," *IEEE Transactions on Magnetics*, vol. 28, No. 5, Sep. 1992, pp. 2889–2891.

K. Chopra and D.D. Woods, "A Maximum Likelihood Peak Detecting Channel," *IEEE Transactions on Magnetics*, vol. 27, No. 6, Nov. 1991, pp. 4819–4821.

(List continued on next page.)

*Primary Examiner*—David L. Ometz
(74) *Attorney, Agent, or Firm*—W. Daniel Swayze, Jr.; W. James Brady; Frederick J. Telecky, Jr.

(57) ABSTRACT

A server hard disk drive integrated circuit (12) is provided for controlling the operation of a server hard disk drive (10) and for processing digital data exchanged between a client (20) and a storage media. The storage media includes a spindle motor for rotating a magnetic disk and a head actuator for positioning a read/write head. The server hard disk drive integrated circuit (12) includes a RAM (30), a disk control circuitry (24), write channel (32), a read channel (34), a servo circuit (36), a motor control circuit (40), and a DSP (26). The disk control circuitry (24) receives and stores requests provided from the client (20) and exchanges digital data with the client (20) and stores the digital data in RAM (30). The write channel (32) generates a write signal during a write operation, and the read channel (34) generates a read signal and an intermediate read signal during a read operation. The servo circuit (36) generates a servo signal during a servo operation, and the motor control circuit (40) receives a motor control input signal and generates a motor control output signal to control the spindle motor and the head actuator. Finally, the digital signal processor (26) initiates the read and write operations as needed to perform the requests of the client. The digital signal processor (26) also performs file management, generates the motor control input signal, and processes the intermediate read signal to generate a read channel parameter.

18 Claims, 1 Drawing Sheet

OTHER PUBLICATIONS

Arvind M. Patel, "A New Digital Signal Processing Channel for Data Storage Products," *IEEE Transactions on Magnetics,* vol. 27, No. 6, Nov. 1991, pp. 4579–4584.

Richard C. Schneider, "Sequence (Viterbi–Equivalent) Decoding," *IEEE Transactions on Magnetics,* vol. 24, No. 6, Nov. 1988, pp. 2539–2541.

J.D. Coker, R.L Galbraith, G.J. Kerwin, J.W. Rae, P.A. Ziperovich, "Implementation of PRML in a Rigid Disk Drive," *IEEE Transactions on Magnetics,* vol. 27, No. 6, Nov. 1991, pp. 4538–4543.

H. Kobayashi and D.T. Tang, "Application of Partial–response Channel Coding to Magnetic Recording Systems," *IBM J. Res. Develop.,* Jul. 1970, pp. 368–375.

Kenneth Abend and Bruce D. Fritchman, "Statistical Detection for Communiation Channels with Intersymbol Interference," *Proceedings of the IEEE,* vol. 58, No. 5, May 1970, pp. 779–785.

G. David Forney, Jr., "Maximum–Likelihood Sequence Estimation of Digital Sequences in the Presence of Intersymbol Interference," *IEEE Transactions on Information Theory,* vol. IT–18, No. 3, May 1972, pp. 363–378.

G. David Forney, Jr., "The Viterbi Algorithm," *Proceedings of the IEEE,* vol. 61, No. 3, Mar. 1973, pp. 268–278.

Gottfried Ungerboeck, "Adaptive Maximum–Likelihood Receiver for Carrier–Modulated Data–Transmission Systems," *IEEE Transactions on Communications,* vol. Com–22, No. 5, May 1974, pp. 624–636.

Peter Kabal and Subbarayan Pasupathy, "Partial–Response Signaling," *IEEE Transactions on Communications,* vol. Com –23, No. 9, Sep. 1975, pp. 921–934.

C.T. Beare, "The Choice of the Desired Impulse Response in Combined Linear–Viterbi Algorithm Equalizers," *IEEE Transactions on Communications,* vol. Com–26, No. 8, Aug. 1978, pp. 1301–1307.

R.A. Baugh, E.S. Murdock, and B.R. Natarajan, "Measurement of Noise in Magnetic Media," *IEEE Transactions on Magnetics,* vol. MAG–19, No. 5, Sep. 1983, pp. 1722–1724.

Hans Burkhardt and Lineu C. Barbosa, "Contributions to the Application of the Viterbi Algorithm," *IEEE Transactions on Information Theory,* vol. IT–31, No. 5, Sep. 1985, pp. 626–634.

Yaw–Shing Tang, "Noise Autocorrelation in Magnetic Recording Systems," *IEEE Transactions on Magnetics,* vol. MAG–21, No. 5, Sep. 1985, pp. 1389–1394.

Roger W. Wood and David A. Petersen, "Viterbi Detection of Class IV Partial Response on a Magnetic Recording Channel," *IEEE Transactions on Communications,* vol. COM–34, No. 5, May 1986, pp. 454–461.

Yaw–Shing Tang, "Noise Autocorrelation in High Density Recording on Metal Film Disks," *IEEE Transactions on Magnetics,* vol. MAG–22, No. 5, Sep. 1986, pp. 883–885.

C. Michael Melas, Patrick Arnett, Irene Beardsley, and Dean Palmer, "Nonlinear Superposition in Saturation Recording of Disk Media," *IEEE Transactions on Magnetics,* vol. MAG–23, No. 5, Sep. 1987, pp. 2079–2081.

Dean Palmer, Pablo Ziperovich, Roger Wood, and Thomas D. Howell, "Identification of Nonlinear Write Effects Using Pseudorandom Sequences," *IEEE Transactions on Magnetics,* vol. MAG–23, No. 5, Sep. 1987, pp. 2377–2379.

Roger Wood, "Jitter vs. Additive Noise in Magnetic Recording: Effects on Detection," *IEEE Transactions on Magnetics,* vol. MAG–23, No. 5, Sep. 1987, pp. 2683–2685.

H.K. Thapar and A.M. Patel "A Class of Partial Response Systems for Increasing Storage Density in Magnetic Recording," *IEEE Transactions on Magnetics,* vol. MAG–23, No. 5, Sep. 1987, pp. 3666–3668.

Yinyi Lin and Jack K. Wolf, "Combined ECD/RLL Codes," *IEEE Transactions on Magnetics,* vol. 24, No. 6, Nov. 1988, pp. 2527–2529.

Catherine A, French, Anthony D. Weathers, and Jack Keil Wolf, "A Generalized Scheme for Generating and Detecting Recording Channel Output Waveforms with Controlled Pulse Polarity," *IEEE Transactions on Magnetics,* vol. 24, No. 6, Nov. 1988, pp. 2530–2532.

Richard C. Schneider, "Write Equalization for Generalized (d,k) Codes," *IEEE Transactions on Magnetics,* vol. 24, No. 6, Nov. 1988, pp. 2533–2535.

Michael Melas, Patrick Arnett, and Jaekyun Moon, "Noise in a Thin Metallic Medium: The Connection with Nonlinear Behaviour," *IEEE Transactions on Magnetics,* vol. 24, No. 6, Nov. 1988, pp. 2712–2714.

Jaekyun J. Moon and L. Richard Carley, "Partial Response Signaling in a Magnetic Recording Channel," *IEEE Transactions on Magnetics,* vol. 24, No. 6, Nov. 1988, pp. 2973–2975.

F. Dollvo, R. Hermann, and S. Olcer, "Performance and Sensitivity Analysis of Maximum–Likelihood Sequence Detection on Magnetic Recording Channels," *IEEE Transactions on Magnetics,* vol. 25, No. 5, Sep. 1989, pp. 4072–4074.

Roger Wood, "New Detector for 1,k Codes Equalized to Class II Partial Response," *IEEE Transactions on Magnetics,* vol. 25, No. 5, Sep. 1989, pp. 4075–4077.

J.W.M. Bergmans, S. Mita, and M. Izumita, "Characterization of Digital Recording Channels by Means of Echo Cancellation Techniques," *IEEE Transactions on Magnetics,* vol. 25, No. 5, Sep. 1989, pp. 4078–4080.

Yinyi Lin, "An Estimation Technique for Accurately Modelling the Magnetic Recording Channel Including Nonlinearites," *IEEE Transactions on Magnetics,* vol. 25, No. 5, Sep. 1989, pp. 4084–4086.

Anthony D. Weathers, Catherine A. French, and Jack Keil Wolf, "Results on 'Controlled Polarity' Modulation and Coding," *IEEE Transactions on Magnetics,* vol. 25, No. 5, Sep. 1989, pp. 4090–4092.

Catherine A. French, "Distance Preserving Run–Length Limited Codes," *IEEE Transactions on Magnetics,* vol. 25, No. 5, Sep. 1989, pp. 4093–4095.

Lyle J. Fredrickson and Jack Keil Wolf, "Error Detecting Multiple Block (d,k) Codes," *IEEE Transactions on Magnetics,* vol. 25, No. 5, Sep. 1989, pp. 4096–4098.

Roger Wood, "Enhanced Decision Feedback Equalization," *IEEE Transactions on Magnetics,* vol. 26, No. 5, Sep. 1990, pp. 2178–2180.

Thomas D. Howell, Donald P. McCown, Thomas A. Diola, Yaw–shing,Tang, Karl R. Hense, Ralph L. Gee, "Error Rate Performance of Experimental Gigabit Per Square Inch Recording Components," *IEEE Transactions on Magnetics,* vol. 26, No. 5, Sep. 1990, pp. 2298–2302.

Pantas Sutardja, "A Post–Compensation Scheme for Peak–Detect Channel," *IEEE Transactions on Magnetics,* vol. 26, No. 5, Sep. 1990, pp. 2303–2305.

L.L. Nunnelley, M.A. Burleson, L.L. Williams, and I.A. Beardsley, "Analysis of Asymmetric Deterministic Bitshift Errors in a Hard Disk File," *IEEE Transactions on Magnetics,* vol. 26, No. 5, Sep. 1990, pp. 2306–2308.

H.K. Thapar, N.P. Sands, W.L. Abbott, and J.M. Cioffi, "Spectral Shaping for Peak Detection Equalization," *IEEE Transactions on Magnetics,* vol. 26, No. 5, Sep. 1990, pp. 2309–2311.

Lyle J. Fredrickson, "Coding for Maximum Likelihood Detection on a Magnetic Recording Channel," *IEEE Transactions on Magnetics,* vol. 26, No. 5, Sep. 1990, pp. 2315–2317.

Lyle J. Fredrickson, "A (D,K,C)=(0,3,5/2) Rate 8/10 Modulation Code," *IEEE Transactions on Magnetics,* vol. 26, No. 5, Sep. 1990, pp. 2318–2320.

R. Hermann, "Volterra Modeling of Digital Magnetic Saturation Recording Channels," *IEEE Transactions on Magnetics,* vol. 26, No. 5, Sep. 1990, pp. 2125–2127.

Roger Wood, Mason Williams, and John Hong, "Considerations for High Data Rate Recording with Thin–Film Heads," *IEEE Transactions on Magnetics,* vol. 26, No. 6, Nov. 1990, pp. 2954–2959.

Jaekyun Moon and L. Richard Carley, "Performance Comparison of Detection Methods in Magnetic Recording," *IEEE Transactions on Magnetics,* vol. 26, No. 6, Nov. 1990, pp. 3155–3172.

William L. Abbott, John M. Cioffi, and Hemant K. Thapar, "Performance of Digital Magnetic Recording with Equalizaton and Offtrack Interference," *IEEE Transactions on Magnetics,* vol. 27, No. 1, Jan. 1991, pp. 705–716.

Jan W.M. Bergmans, Seiichi Mita, and Morishi Izumita, "A Simulation Study of Adaptive Reception Schemes for High–Density Digital Magnetic Storage," *IEEE Transactions on Magnetics,* vol. 27, No. 1 Jan. 1991, pp. 717–723.

Ching Tsang and Yaw–Shing Tang, "Time–Domain Study of Proximity–Effect Induced Transition Shifts," *IEEE Transactions on Magnetics,* vol. 27, No. 2, Mar. 1991, pp. 795–802.

K.B. Klaassen, "Magnetic Recording Channel Front–Ends," *IEEE Transactions on Magnetics,* vol. 27, No. 6, Nov. 1991, pp 4503–4508.

John Hong, Roger Wood, David Chan, "An Experimental 180Mb/sec PRML Channel for Magnetic Recording," *IEEE Transactions on Magnetics,* vol. 27, No. 6, Nov. 1991, pp. 4532–4537.

Jonathan D. Coker, Richard L. Galbraith, and Gregory J. Kerwin, "Magnetic Characterization Using Elements of a PRML Channel," *IEEE Transactions on Magnetics,* vol. 27, No. 6, Nov. 1991, pp 4544–4548.

L. Richard Carley and John G. Kenney, "Comparison of Comoutationally Efficient Forms of FDTS/DF Against PR4–ML," *IEEE Transactions on Magnetics,* vol. 27, No. 6, Nov. 1991, pp. 4567–4572.

Jaekyun Moon, "Discrete–Time Modeling of Transition–Noise Dominant Channels and Study of Detection Performance," *IEEE Transactions on Magnetics,* vol. 27, No. 6, Nov. 1991, pp. 4573–4578.

Jack Keil Wolf, "A Survey of Codes for Partial Response Channels," *IEEE Transactions on Magnetics,* vol. 27, No. 6, Nov. 1991, pp. 4585–4589.

Norman L. Koren, "Matched Filter Limits and Code Performance in Digital Magnetic Recording," *IEEE Transactions on Magnetics,* vol. 27, No. 6, Nov. 1991, pp. 4594–4599.

H.M. Hilden, D.G. Howe, and E.J. Weldon, Jr., "Shift Error Correcting Modulation Codes," *IEEE Transactions on Magnetics,* vol. 27, No. 6, Nov. 1991, pp. 4600–4605.

Derek D. Kumar and Bill J. Hunsinger, "ACT–enabled 100MHz Channel Equalizer," *IEEE Transactions on Magnetics,* vol. 27, No. 6, Nov. 1991, pp. 4799–4803.

Alan J. Armstrong and Jack Keil Wolf, "Performance Evaluation of a New Coding Scheme for the Peak Detecting Magnetic Recording Channel," *IEEE Transactions on Magnetics,* vol. 27, No. 6, Nov. 1991, pp. 4804–4806.

S. Raghavan and H.K. Thapar, "Feed–Forward Timing Recovery for Digital Magnetic Recording," *International Conference on Comunications Conference Record,* vol. 2, 1991, pp. 794–798.

S.A. Raghavan and H.K. Thapar, "On Feed–Forward and Feedback Timing Recovery for Digital Magnetic Recording Systems," *IEEE Transactions on Magnetics,* vol. 27, No. 6, Nov. 1991, pp 4810–4812.

James Fitzpatrick and Jack Keil Wolf, "A Maximum Likelihood Detector for Nonlinear Magnetic Recording," *IEEE Transactions on Magnetics,* vol. 27, No. 6, Nov. 1991, pp. 4816–4818.

John G. Kenney, Peter Alexis McEwen, and L. Richard Carley, "Evaluation of Magnetic Recording Detection Schemes for Thin Film Media," *IEEE Transactions on Magnetics,* vol. 27, No. 6, Nov. 1991, pp. 4822–4824.

Pablo A. Ziperovich, "Performance Degradaton of PRML Channels Due to Nonlinear Distortions," *IEEE Transactions on Magnetics,* vol. 27, No. 6, Nov. 1991, pp. 4825–4827.

Jaekyun Moon and Jian–Gang Zhu, "Nonlinear Effects of Transition Broadening," *IEEE Transactions on Magnetics,* vol. 27, No. 6, Nov. 1991, pp. 4831–4833.

Jaekyun Moon, "Signal–to–Noise Ratio Degradation with Channel Mismatch," *IEEE Transactions on Magnetics,* vol. 27, No. 6, Nov. 1991, pp. 4837–4839.

R.D. Barndt, A.J. Armstrong, H.N. Bertram, and J.K. Wolf, "A Simple Statistical Model of Partial Erasure in Thin Film Disk Recoridng Systems," *IEEE Transactions on Magnetics,* vol. 27, No. 6, Nov. 19912, pp. 4978–4980.

Y. Tang and C. Tsang, "A Technique for Measuring Non-linear Bit Shift," *IEEE Transactions on Magnetics,* vol. 27, No. 6, Nov. 1991, pp. 5316–5318.

R.D. Barndt and J.K. Wolf, "Modeling and Signal Processing fot the Nonlinear Thin Film Recording Channel," *IEEE Transactionsl on Magnetics,* vol. 28, No. 5, Sep. 1992, pp. 2710–2712.

H. Thapar, J. Rae, C. Shung. R. Karabed, and P. Siegel, "On the Performance of a Rat 8/10 Matched Spectral Null Code for Class–4 Partial Response," *IEEE Transactions on Magnetics,* vol. 28, No. 5, Sep. 1992, pp. 2883–2888.

Hamid Shafiee and Jaekyun Moon, "Low–Complexity Viterbi Detection for a Family of Partial Response System," *IEEE Transactions on Magnetics,* vol. 28, No. 5, Sep. 1992, pp. 2892–2894.

Weining Zeng and Jaekyun Moon, "Modified Viterbi Algorithm for a Jitter–dominant $1-D^2$ Channel," *IEEE Transactions on Magnetics,* vol. 28, No. 5, Sep. 1992, pp. 2895–2897.

William E. Ryan, "Comparative Performance Between Drop–Out Detection and Viterbi Reliability Metric Erasure Flagging," *IEEE Tranasctions on Magnetics,* vol. 28, No. 5, Sep. 1992, pp. 2898–2900.

C. Menyennett, L. Botha, H.C. Ferreira, "A NewRunlength Limited Code for Binary Asymmetric Channels," *IEEE Transactions on Magnetics,* vol. 28, No. 5, Sep. 1992, pp. 2901–2903.

Gang H. Lin, Rick Barndt, H. Neal Bertram, and Jack K. Wolf, "Experimental Studies of Nonlinearities in High Density Disk Recording," *IEEE Transactions on Magnetics,* vol. 28, No. 5, Sep. 1992, pp. 3279–3281.

Ralph Simmons and Robert Davidson, "Media Design for User Density of up to 3 Bits per Pulse Width," *IEEE Transactions on Magnetics,* vol. 29, No. 1, Jan. 1993, pp. 169–176.

Jaekyun Moon and Jian–Gang Zhu, "Nonlinearities in Thin–Film Media and Their Impact on Data Recovery," *IEEE Transactions on Magnetics,* vol. 29, No. 1, Jan. 1993, pp. 177–182.

R.D. Barntd, A.J. Armstrong, and J.K. Wolf, "Media Selection for High Density Recording Channels," *IEEE Transactions on Magnetics,* vol. 29, No. 1, Jan. 1993, pp. 183–188.

Dean C. Palmer and Jonathan D. Coker, "Media Design Considerations for a PRML Channel," *IEEE Transactions on Magnetics,* vol. 29, No. 1, Jan. 1993, pp. 189–194.

Zadian Software, Inc., *Disk Drive Technology,* Copyright 1990, San Jose, CA.

Roy D. Cideciyan, Francois Dolivo, Reto Hermann, Walter Hirt, and Wolfgang Schott, "A PRML System for Digital Magnetic Recording," *IEEE Journal on Selected Areas in Communications,* vol. 10, No. 1, Jan. 1992, pp. 38–56.

* cited by examiner

SERVER HARD DISK DRIVE INTEGRATED CIRCUIT AND METHOD OF OPERATION

TECHNICAL FIELD OF THE INVENTION

This invention relates in general to the field of information storage and more particularly to a server hard disk drive integrated circuit and method of operation.

BACKGROUND OF THE INVENTION

As computer hardware and software technology continues to progress, the need for larger and faster mass storage devices for storing computer software and data continues to increase. Electronic databases and computer applications such as multimedia applications require large amounts of mass storage capacity, such as hard disk drive storage capacity.

To meet these ever increasing demands, hard disk drives (HDDs) continue to evolve and advance. Some of the early disk drives had a maximum storage capacity of five megabytes and used fourteen inch platters, whereas today's HDDs are commonly over one gigabyte and use 3.5 inch platters. Similarly, advances in the amount of data stored per unit of area, or areal density, have dramatically accelerated. For example, in the 1980's, areal density increased about thirty percent per year while in the 1990's annual areal density increases have been around sixty percent. The cost per megabyte of a HDD is inversely related to its areal density.

In general, mass storage devices and systems, such as HDDs, include a magnetic storage media, such as rotating disks or platters, a spindle motor, read/write heads, an actuator for positioning the read/write heads, a pre-amplifier, and a variety of electronic circuitry for controlling the operation of the HDD and for processing data. The electronic circuitry is implemented as separate circuitry elements and integrated circuits such as analog integrated circuits and digital integrated circuits. These circuitry elements include such elements as a read channel, a write channel, a servo controller, a motor control circuit, read-only memory (ROM), random-access memory (RAM), and a variety of disk control and processing circuitry to control the operation of the HDD and to properly interface the HDD to a system bus such as a personal computer system bus. A separate microprocessor is generally provided for executing instructions to control the operation of the HDD.

An HDD performs write, read, and servo operations when storing and retrieving data. A typical HDD performs a write operation by receiving data from a system bus and storing the data in local memory. The microprocessor schedules a series of events to allow the information to be transferred to the disk platters through a write channel.

The read/write heads are positioned on the appropriate track and the appropriate sector of the track is located. Finally, the data from the RAM is stored at the located sector of the disk platter by providing the data through the write channel. The write channel may encode the data so that the data can be more reliably retrieved later. A sector generally has a fixed data storage capacity, such as 512 bytes of user data per sector.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data. The binary or digital data is then transferred from the read channel and is stored in the RAM. The microprocessor may then communicate to the host that data is ready to be transferred.

As the disk platters are moving, the read/write heads must align or stay on a particular track. This is accomplished by the servo operation. In a servo operation, a servo wedge is read from the disk that generally includes track identification information and track misregistration information. The track misregistration information may also be referred to as a position error information. The position error information may be provided as servo bursts and may be used during read and write operations to ensure that the read/write heads are properly aligned on a track. The track identification information is used during read and write operations so that a track may be properly identified.

When reading data, traditional HDD data channels often use a technique known as peak detection for extracting or detecting digital information from the analog information stored on the magnetic media during read operations. Peak detection involves level detecting the waveform and determining if the waveform level is above a threshold level during a sampling window. For example, if the waveform level is above the threshold level, the data is considered a "one." More recently, advanced techniques utilizing discrete time signal processing (DTSP) to reconstruct the original data written to the disk are being used in read channel electronics to improve areal density. In these techniques, the data is synchronously sampled in a synchronously sampled data (SSD) channel using a data recovery clock. The sample is then processed through a series of mathematical manipulations using signal processing theory to reconstruct the original data written to the disk.

There are several types of SSD channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in several of these systems is usually performed by a Viterbi detector implementing the Viterbi algorithm, named after Andrew Viterbi who developed it in 1967. The SSD channel, is also referred to as a read channel or data channel.

As discussed above, the electronic circuitry used to implement a HDD is complex and is implemented using separate circuitry elements and integrated circuits such as analog integrated circuits and digital integrated circuits. The separate circuitry elements generally increase the overall cost and complexity of the HDD and increase overall power consumption. Power consumption is especially critical in portable electronic applications such as laptop and notebook computers. Furthermore, the separate circuitry elements often complicate "trouble shooting" when repairing an HDD.

The separate circuitry elements and integrated circuits often harm overall HDD performance, especially in high speed applications, because of the additional noise and undesirable circuitry characteristics that are present due to the interconnections needed between the various separate circuitry elements. For example, it is difficult and often impossible for certain types of high speed signal processing, such as read channel signal processing, to be performed because of the undesirable circuitry characteristics introduced through the interconnections between a separate microprocessor and the source of the signal being processed.

The separate circuitry elements of a particular HDD are generally designed so that the HDD may interface with one particular interface or system bus. This prevents the HDD from being used on other systems and networks which use different interfaces or system buses. Also, HDDs interface directly to the bus of a computer, such as a stand-alone personal computer or a server of a network, and cannot directly couple or interface with a network bus or other bus and serve as a network or stand-alone element. This further limits the flexibility of HDDs.

The number of computer networks such as local area networks (LANs) and wide area networks (WANs) continues to increase as the demand remains high. Computer networks often include network HDDs that are typically implemented in a computer network as HDDs coupled through a network server computer. In this manner, network HDDs couple to the network server computer in much the same manner that a non-networked HDD couples to a single-user computer. As more and more storage capacity is needed in a network, additional network HDDs may be added at the network server computer until all expansion slots have been exhausted. Once all expansion slots have been exhausted, existing network HDDs must be taken out of service and replaced with higher capacity drives. This presents serious disadvantages and problems because the information stored on the network HDD must being taken out of service and transferred to another network hard disk drive. This process is expensive, time consuming, and often makes network data or information unavailable for a period of time. This process can also result in file management problems and lost or missing data.

SUMMARY OF THE INVENTION

From the foregoing it may be appreciated that a need has arisen for a server hard disk drive integrated circuit and method of operation that allows a mass storage device, such as a network or server hard disk drive, to be controlled by a single integrated circuit that combines both control and processing functions for enhanced performance and reduced costs. Furthermore, it allows the network or server hard disk drive to directly interface with virtually any network without having to couple through a network computer or server. In accordance with the present invention, a server hard disk drive integrated circuit and method of operation are provided which substantially eliminate the disadvantages and problems outlined above.

According to the present invention, a server hard disk drive integrated circuit for controlling the operation of a server hard disk drive and for processing digital data exchanged between a client and a storage media of the server hard disk drive is provided. The storage media includes a motor, such as a servo or spindle motor, for rotating a magnetic disk and a head actuator for positioning a read/write head. The server hard disk drive integrated circuit includes a data memory, a disk control circuitry, a write channel, a read channel, a servo circuit, a motor control circuit, and a digital signal processor (DSP). The disk control circuitry receives and stores requests from the client, exchanges digital data with the client, and controls the storage of the digital data in the data memory. The write channel generates a write signal during a write operation, and the read channel generates a read signal and an intermediate read signal during a read operation. The servo circuit generates a servo signal during a servo operation, and the motor control circuit receives a motor control input signal and generates a motor control output signal to control the servo motor and the head actuator. Finally, the digital signal processor initiates read and write operations as needed to perform the requests provided from the client. The digital signal processor also performs file management functions, generates the motor control input signal in response to receiving the servo signal, and processes the intermediate read signal to generate a read channel parameter.

The present invention provides various technical advantages. A technical advantage of the present invention includes reduced overall hard disk drive fabrication costs due to the integrated circuit fabrication savings achieved by integrating a significant portion of the hard disk drive electronics into one integrated circuit that includes both analog and digital circuitry. Another technical advantage of the present invention includes improved and faster hard disk drive performance due to a tighter coupling between the hard disk drive processor and the various circuitry components. For example, the digital signal processor may analyze intermediate read signals generated by the read channel so that read channel circuitry parameters may be calculated and used by the read channel to improve overall performance. Yet another technical advantage of the present invention includes lower overall power consumption which is especially important in portable electronic devices such as laptop computers and notebook computers. Still yet another technical advantage of the present invention includes the capability to independently operate a hard disk drive as a stand alone server or network storage device that can receive commands and exchange data with a variety of clients of a computer network without having to occupy the expansion slot of a computer or to use the controller of a computer. For example, the present invention may be used as a network hard disk drive that interfaces with the bus of a local area network to serve as an independent network storage device accessible by the various clients of the local area network. Another technical advantage includes the capability to provide multiple interfaces so that the server hard disk drive is compatible with more than one type of bus interface. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
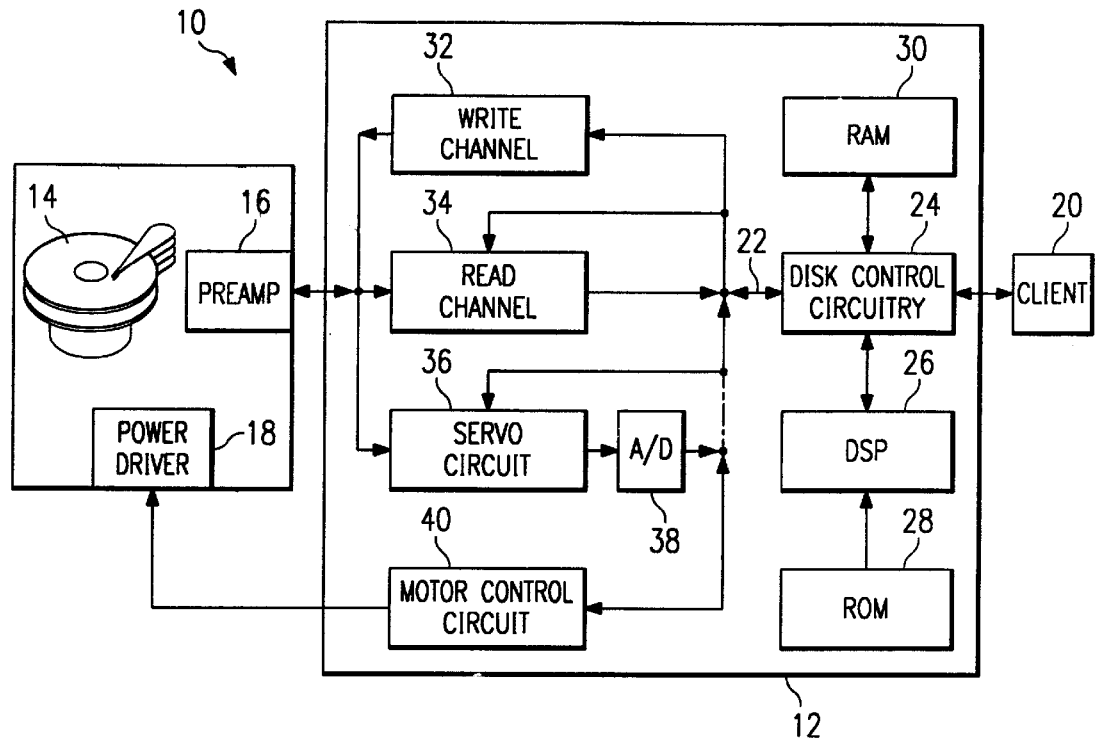
FIG. 1 is a block diagram illustrating a server hard disk drive integrated circuit of a server hard disk drive.

FIG. 1 is a block diagram of a server hard disk drive 10 which is used for storing data and exchanging data with a client 20 through an interface. Server hard disk drive 10 includes a server hard disk drive integrated circuit 12, a disk/head assembly 14, a preamplifier 16, and a power driver 18. Disk/head assembly 14 may also be referred to as a storage media and will generally include a stack of magnetically coated platters for storing data that is represented as magnetic transitions on the magnetic platters and a plurality of read/write heads for reading and writing data on both sides of each magnetic platter or disk. The read/write heads may be implemented using any available read/write head such as a magneto-resistive head. Disk/head assembly 14 will also include a servo or spindle motor (not shown in FIG. 1) to rotate magnetic disks of disk/head assembly 14 and a voice coil motor or head actuator to position the read/write heads of disk/head assembly 14.

Power driver 18 receives a motor control output signal to control the spindle motor and the head actuator of disk/head assembly 14. In other embodiments, power driver 18 may be provided as two separate circuit elements with one circuit element dedicated to controlling the spindle motor and the other circuit element dedicated to controlling the head actuator. Preamplifier 16 amplifies data signals exchanged between the read/write heads of disk/head assembly 14 and server hard disk drive integrated circuit 12.

Server hard disk drive integrated circuit 12 controls the operation of server hard disk drive 10 and processes digital data or information exchanged between client 20 and disk/head assembly 14. Server hard disk drive integrated circuit 12 includes a plurality of circuit modules or circuit elements as discussed more fully below. Server hard disk drive integrated circuit 12 also provides an interface between server hard disk drive 10 and client 20. This interface or connection will normally be a network connection so that server hard disk drive 10 may serve as a network storage device to provide storage for numerous clients of a network such as a LAN. In this manner, server hard disk drive 10 functions as a network node and does not have to couple to the network through a network computer or server. However, server hard disk drive 10 may couple directly to a single-user or stand-alone computer and serve as a local mass storage device.

Server hard disk drive integrated circuit 12 includes a disk control circuitry 24 and a digital signal processor (DSP) 26 that may be implemented using any of a variety of interface circuitry and/or software to allow server hard disk drive 10 to couple to essentially any available network or computer. For example, disk control circuitry 24 and DSP 26 may be implemented to interface hard disk drive integrated circuit 12 with client 20 through a Universal Serial Bus (USB), a 1394 data transport bus, or any other bus or interface.

The 1394 data transport bus is an IEEE data transport bus that currently supports up to 63 nodes per bus, and up to 1023 buses. The 1394 bus supports both asynchronous and isochronous data and can be configured as a tree, a daisy chain, or any combination thereof. The USB currently supports 12 megabits per second data transfer for up to 63 devices and includes three basic types of data transfer: isochronous or streaming real time data; asynchronous interactive data; and asynchronous block transfer data. Generally, the 1394 data transport bus is used for higher bandwidth applications while the USB is used for lower bandwidth applications. In other embodiments, hard disk drive integrated circuit 12 may be provided with the capability to interface with multiple buses or devices. This further enhances the compatibility and flexibility of hard disk drive integrated circuit 12 and achieves platform independence by allowing server hard disk drive 10 to easily interface with different networks and computers using different interfaces. Server hard disk drive 10 may include multiple connector types for interfacing with the various different buses and devices and may include a hardware or software switch to configure server hard disk drive 10 to operate using a desired interface format.

In the one embodiment of server hard disk drive integrated circuit 12 illustrated in FIG. 1, server hard disk drive integrated circuit 12 includes a random-access memory (RAM) 30, a read-only memory (ROM) 28, a bus 22, a write channel 32, a read channel 34, a servo circuit 36, an analog-to-digital converter (A/D) 38, a motor control circuit 40, in addition to disk control circuitry 24 and DSP 26 as introduced above. DSP 26 controls the overall operation of server hard disk drive 10 by initiating read, write, and servo operations as needed to perform requests provided from client 20. In accomplishing this, DSP 26 performs file management functions by correlating the requests from client 20 to the actual location of files and information stored on the magnetic platters of disk/head assembly 14. DSP 26 performs file management functions to keep track of where information is stored on the various platters of disk/head assembly 14. This may be performed using a variety of different methods such as by creating and managing a file allocation table on disk/head assembly 14. DSP 26 performs its various functions while operating under the control of various routines and algorithms stored in ROM 28. ROM 28 may include any number of routines provided as instructions compatible with DSP 26.

DSP 26 also generates a motor control input signal that is used by motor control circuit 40 to control one or more elements of disk/head assembly 14 such as the head actuator and the spindle motor. The head actuator must be properly controlled to position the read/write heads over the track or location of the magnetic platters so that information can be properly exchanged with the platters. DSP 26 generates the motor control input signal in response to receiving a servo signal generated by servo circuit 36 that may include such information as a track identification information and position error information. In generating the motor control input signal, DSP 26 operates under the control of an algorithm or software routine, preferably stored in ROM 28, such as a servo algorithm. DSP 26, servo circuit 36, and motor control circuit 40 form a control system to control the head actuator and the spindle motor. The fact that DSP 26, servo circuit 36, and motor control circuit 40 are closely coupled in one integrated circuit improves overall performance.

DSP 26 is also designed to perform signal analysis on intermediate read signals generated within read channel 34. DSP 26 may then generate a read channel parameter in response to performing the signal analysis. The read channel parameter may be stored in memory, either locally or within read channel 34 as indicated by the arrow directed to read channel 34, so that the read channel circuitry may access the read channel parameter. For example, DSP 26 may perform adaptive filtering to generate filter coefficients that may be used by read channel 34. These coefficients or parameters may be generated and updated on a real-time basis. Examples of each of the various functions performed by DSP 26 are provided below.

DSP 26 will preferably be implemented as a specialized digital signal processor as opposed to a generic microprocessor. However, it should be understood that the present invention could also be implemented using a generic or non-specialized microprocessor. DSPs provide two main advantages over non-specialized microprocessors in that they have powerful mathematical computational abilities, much more than normal computer microprocessors, and DSPs provide an instruction set that allows them to be easily programmed to perform many different functions from one moment to the next.

Disk control circuitry 24 assists DSP 26 in performing its functions and may include any of a variety of circuitry elements to achieve this. Generally, disk control circuitry 24 will include digital circuitry, such as digital logic circuitry, to perform functions such as bus arbitration to control access to bus 22 so that digital data and control signals may be properly transferred, routed, and exchanged within server hard disk drive integrated circuit 12 during the various operations such as read, write, and servo operations. In an actual implementation, bus 22 may be implemented using multiple buses and may be provided as a parallel bus.

The digital circuitry of disk control circuitry 24 may also generate internal enable signals that are provided to the various circuitry elements of server hard disk drive integrated circuit 12. For example, a read, write, and a servo enable signal may be provided as needed. These enable signals may be generated using such circuitry as state machines, counters, and timers. In one embodiment, a read enable signal may be provided to read channel 34, a write enable signal may be provided to write channel 32, and a servo enable signal may be provided to servo circuit 36. The servo enable signal, for example, may be generated using a timer, a counter, or a phase locked loop circuit to generate a servo enable signal at appropriate intervals during read and write operations. Disk control circuitry 24 also interfaces with client 20 to receive and communicate data and control signals from RAM 30 as needed to properly interface with client 20. RAM 30 may be referred to as a data memory and may be implemented as one or multiple memory blocks with addressable memory elements. In general, disk control circuitry 24 may be implemented and configured using commonly available digital circuitry well known to those of ordinary skill in the art.

Disk control circuitry 24 may further include a digital-to-analog (D/A) converter to convert the internal or intermediate read channel signals that are provided from read channel 34 in the analog domain to the digital domain. These digital intermediate read channel signals may then be provided to DSP 26 for any desired analysis or signal processing.

In operation, client 20 provides commands or requests to server hard disk drive 10 to perform desired functions such as storing a computer file or retrieving a stored computer file. DSP 26, under the software control of routines and algorithms stored in ROM 28, and disk control circuitry 24 provide the interface with client 20 by receiving and responding to the requests received from client 20. As discussed above, this interface may be virtually any interface such as a network interface. For example, when client 20 attempts to store or retrieve information from server hard disk drive 10, commands or requests are first communicated from client 20 and stored in internal memory, such as RAM 30, by disk control circuitry 24 so that DSP 26 may access and interpret these commands and initiate read, write, and servo operations in server hard disk drive integrated circuit 12 as requested or as needed.

When storing information, client 20 communicates the data or information to be stored to disk control circuitry 24 where the information is stored in RAM 30. DSP 26, under the control of an algorithm in ROM 28, will schedule or initiate a write operation to store the information by routing the information from RAM 30 to write channel 32. Write channel 32 will receive and process this inbound digital data signal and will generate a write signal in response. The write signal is then communicated to disk/head assembly 14 where it is stored. Write channel 32 may be implemented using any known or available write channel. For example, write channel 32 may include a register, a scrambler, an encoder, a precoder, a serializer, and a write precompensation circuit.

When retrieving information, DSP 26, under the control of an algorithm in ROM 28, will schedule or initiate a read operation to retrieve the desired information from disk/head assembly 14. Read channel 34 will receive and process a read signal to generate an outbound digital data signal. In the process of accomplishing this, read channel 34 will generate various intermediate read signals that may be processed by DSP 26, either in a real-time mode or an off-line mode, to generate read channel circuitry parameters. This is discussed more fully below in connection with FIG. 2. The outbound digital data signal is then provided through bus 22 and is stored at RAM 30 by disk control circuitry 24 or sent directly to client 20. In either event, the outbound digital data signal in eventually provided to client 20 with the assistance of disk control circuitry 24. Read channel 34 may be implemented using any known or available read channel. For example, read channel 34 may be implemented as a synchronously sampled read channel that uses discrete time signal processing such as the one illustrated in FIG. 2.

As mentioned above, DSP 26 performs file management functions for both read and write operations by correlating the requests from client 20 to the actual location of files and information stored on the magnetic platters of disk/head assembly 14. DSP 26 performs file management functions to keep track of where information is stored. This may be performed using a variety of different methods such as by managing a file table.

During both read and write operations, the head actuator must be properly positioned on the correct track of the storage media. Similarly, the spindle motor must be operated at the correct speed to ensure optimal performance. As mentioned above, this is accomplished through the combination of DSP 26, servo circuit 36, motor control circuit 40, and power driver 18 during a servo operation. DSP 26, servo circuit 36, and motor control circuit 40 form a control system to control the head actuator and the spindle motor. The fact that DSP 26, servo circuit 36, and motor control circuit 40 are closely coupled in one integrated circuit improves overall control system performance.

Servo circuit 36 receives and processes a servo wedge signal from the storage media to generate a servo signal. The servo wedge signal, and hence the servo signal, contains position error information and track identification information. The servo signal, in the one embodiment of FIG. 1, is generated in the analog domain and is then converted to the digital domain by A/D 38. In alternative embodiments, the servo signal is provided from servo circuit 36 in the digital domain. The servo signal is then provided to DSP 26 through bus 22. DSP 26, operating under the control of an algorithm stored in ROM 28, receives the servo signal and generates a motor control input signal in response. The motor control input signal contains information relating to adjustments that may be needed in the position of the head actuator and the spindle motor.

The motor control input signal is then provided to motor control circuit 40 where a motor control output signal is generated and provided to power driver 18. Motor control circuit 40 contains circuitry to properly interface with power driver 18 so that the head actuator and the spindle motor may be properly controlled. In alternative embodiments, motor control circuit 40 may generate separate motor control output signals to control specific devices of disk/head assembly 14. For example, one motor control output signal may be provided to power driver 18 to control a voice coil motor to position the head actuator, while a separate motor control output signal may be provided to power driver 18 to control the speed of the spindle motor. In such a case, power drive 18 may be implemented using any of a variety of known or available circuitry to drive the various devices of disk/head assembly 14.

Figure 2:
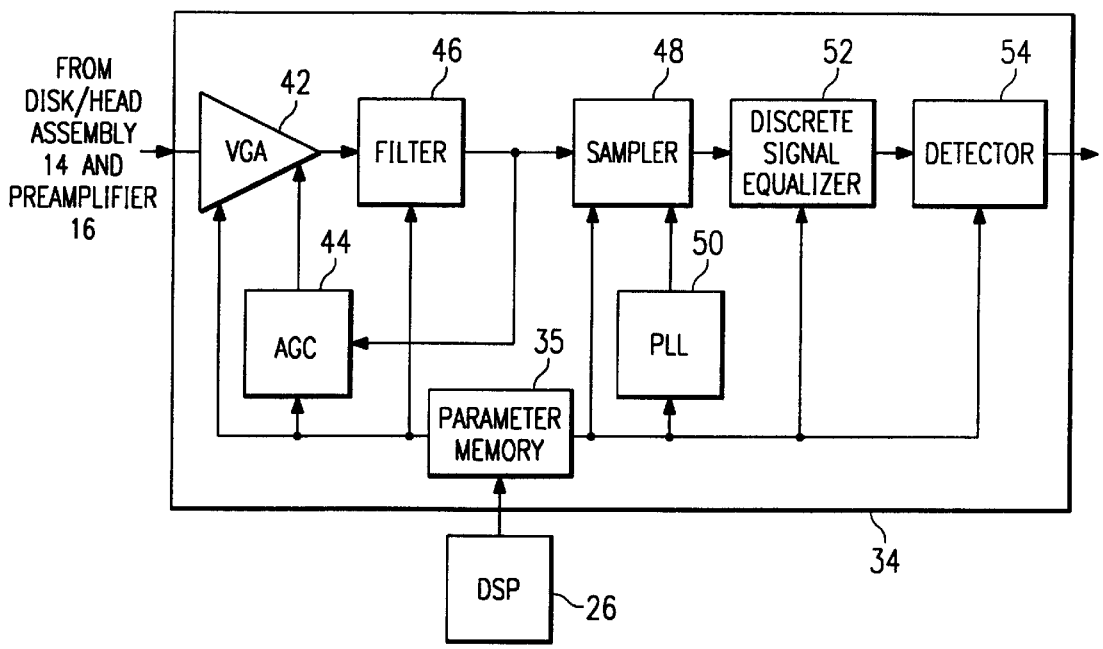
FIG. 2 is a block diagram illustrating a read channel of the server hard disk drive integrated circuit.

FIG. 2 is a block diagram illustrating read channel 34 of server hard disk drive integrated circuit 12. It should be noted that the implementation of read channel 34, as illustrated in FIG. 2, is only one embodiment of a read channel and that the present invention is not limited to any one particular type or arrangement of read channel. In fact, the present invention could be implemented or practiced using virtually any type of read channel. For example, read channel 34 may be implemented as a synchronously sampled read channel that uses discrete time signal processing, such as the one illustrated in FIG. 2, or as a peak detection read channel that attempts to identify data through peak detection and level detection techniques. Read channel 34 receives and processes a read signal from preamplifier 16 and disk/head assembly 14 during a read operation and generates an outbound digital data signal in response. In processing the read signal and generating the outbound digital data signal, read channel 34 may use a circuitry or read channel parameter that was calculated by DSP 26 and stored in a memory that is accessible by read channel 34.

Read channel 34, in the one embodiment of FIG. 2, includes a variable gain amplifier (VGA) 42, an automatic gain control circuit (AGC) 44, a filter 46, a sampler 48, a phase locked loop (PLL) 50, a discrete signal equalizer 52, and a detector 54. A parameter memory 35 is also shown provided as part of read channel 34. Parameter memory 35 stores the circuitry or read channel parameter generated by DSP 26 in response to analyzing an intermediate read channel signal. Depending on the particular implementation and the particular signal analysis performed by DSP 26, parameter memory 35 may be accessible by any of the various circuitry elements of read channel 34 that utilize a read channel circuitry parameter generated by DSP 26 and stored in parameter memory 35. Parameter memory 35 may be provided as part of read channel 34 or separately from read channel 34.

Read channel 34 receives the read signal at VGA 42 where the signal is amplified by an amount that is controlled by AGC 44 to generate an amplified read signal. VGA 42, along with AGC 44, work together to provide an appropriate amplification or gain to the analog read signal. AGC 44 receives a feedback signal from the output of filter 46 so that appropriate adjustments can be made in the amplification or gain provided to the read signal by VGA 42.

The amplified read signal is then provided by VGA 40 to filter 46 for further processing. Filter 46, in one embodiment, filters the signal to remove unwanted high frequency noise and thus is implemented as a low pass filter. Filter 46 may also provide waveform shaping with amplitude boost. For example, filter 46 may be a continuous-time 7th order filter designed using Gm/C components. The cutoff frequency and boost of filter 46 may be programmable. As mentioned above, VGA 42, filter 46, and AGC 44 form a continuous-time AGC control loop. The filtered read signal of filter 46 is provided to sampler 48.

Sampler 48 samples the filtered read signal from filter 46 and generates a discrete read signal having discrete values. Sampler 48 converts the filtered read signal from continuous-time to discrete-time. The filtered read signal is sampled synchronously at times that correspond to the various magnetic transitions stored on the magnetic or storage media of disk/head assembly 14. These magnetic transitions correspond to the data stored on disk/head assembly 14. Sampler 48 samples the signal and holds the value until the next sample occurs. PLL 50 provides a sampling clock or signal to sampler 48 that controls when sampler 48 samples and holds the filtered read signal. Each discrete value of the discrete read signal corresponds to the value or amplitude of the filtered read signal at the time the signal is sampled by sampler 48. Sampler 48 may be implemented as a sample and hold circuit such as a circular sample and hold circuit that is time sequence multiplexed to discrete signal equalizer 52 so that the correct time sequenced value is presented to discrete signal equalizer 52.

PLL 50 may be implemented using any of a variety of known circuitry to generate the sampling clock or signal described above. Preferably, PLL 50 will include a voltage controlled oscillator and phase detector. PLL 50 will generally receive a crystal clock or timing signal input (not shown in FIG. 2) to assist in establishing the sampling clock. PLL 50 may also receive an error signal (also not shown in FIG. 2) to further adjust the timing of the sampling clock or signal. However, it should be understood the present invention is not limited to any one implementation or type of phase locked loop.

Discrete signal equalizer 52 receives the discrete read signal from sampler 48 and generates an equalized read signal having discrete levels corresponding to the magnetic transitions on disk/head assembly 14. Discrete signal equalizer 52 may be implemented as an analog finite impulse response filter. In such a case, discrete signal equalizer 52 receives a plurality of filter coefficients or taps and uses them to equalize or filter the discrete read signal. These filter coefficients may be generated by DSP 26 and stored in parameter memory 35 where they are accessible by discrete signal equalizer 52. The discrete read signal is equalized to the target function of detector 54.

Discrete signal equalizer 52, when implemented as an analog finite impulse response filter, includes a plurality of multipliers. Each multiplier receives one of the plurality of filter coefficients and a consecutive discrete value of the discrete read signal. The outputs of each of the multipliers are then provided as inputs to an adder, such as an analog summer, which sums the inputs to provide the equalized read signal. As the discrete read signal changes, the consecutive discrete values of the discrete read signal that are provided to each multiplier are shifted to the next multiplier such that a new discrete value is now provided to the first multiplier and the oldest discrete value is dropped from the last multiplier.

Discrete signal equalizer 52 may be implemented as a five tap filter with coefficients set by programmable digital circuitry. Discrete signal equalizer 52 would then receive five digital coefficients or filter tap weights that are converted to an analog value through a digital-to-analog converter. Each coefficient is then provided to a separate multiplier. The outputs of all five of the multipliers are provided to an analog summer to generate the equalized read signal. Although five coefficients or taps are described, the number of coefficients or taps and the corresponding number of multipliers may vary.

Alternatively, an analog-to-digital converter may be provided in place of sampler 48 between filter 48 and discrete signal equalizer 52 to convert the filtered read signal from the analog domain to the digital domain. In such a case, the analog-to-digital converter will be controlled by PLL 50. As such, discrete signal equalizer 52 will be implemented as a digital filter and will receive the digital signal from the analog-to-digital converter. Discrete signal equalizer 52 will filter the digital signal to generate the equalized read signal. In one embodiment, discrete signal equalizer 52 will be implemented as an adaptive digital filter, such as an infinite impulse response or a finite impulse response, that is capable of receiving and using filter tap coefficients. The adaptive filtering may be performed by DSP 26 and the filter tap coefficients may be provided within parameter memory 35 so that they are accessible by the digital filter.

Detector 54 receives the discrete read signal from discrete signal equalizer 52. Detector 54 analyzes the signal and generates the outbound digital signal corresponding to the data stored on disk/head assembly 14. In one embodiment, detector 54 may be a maximum likelihood detector or Viterbi detector implementing the Viterbi algorithm. Assuming that detector 54 is implemented as a Viterbi detector, detector 54 includes a metric circuit and a trellis circuit for analyzing the signal. The metric circuit receives the discrete read signal from discrete signal equalizer 52 and performs an add, compare, and select function to determine whether a magnetic transition may or may not have occurred on the disk. The output of the metric circuit is provided to the trellis circuit which acts as a decision tree for sequence decoding. The trellis circuit generates the outbound digital data signal which serves as the output of detector 54. Although not illustrated in FIG. 2, read channel 34 may also include a synchronization detection circuit and a deserializer to properly interface the outbound digital signal with bus 22.

As illustrated, read channel 34 contains a variety of intermediate read signals such as, for example, the amplified read signal, the filtered read signal, the discrete read signal, and the equalized read signal. These intermediate read signals may be accessed and analyzed by DSP 26 while operating under the control of software provided in memory, such as ROM 28, so that any desired read channel circuitry parameters may be generated and stored in parameter memory 35, where they are accessible by the circuitry of read channel 34. The intermediate read channel signals that are provided as analog signals may be converted to the digital domain by an analog-to-digital converter, not shown in FIG. 2, and then analyzed by DSP 26. The analog-to-digital converter may be provided as part of read channel 34 or it may be provided separately.

The fact that DSP 26 is implemented as a single integrated circuit or integrated circuit package greatly enhances the accessibility of the various intermediate read signals of read channel 34. This allows DSP 26 to receive and analyze any of the intermediate read signals. For example, assuming that discrete signal equalizer 52 is provided as a digital filter, DSP 26 may perform adaptive filtering to change the taps or coefficients of the digital filter as needed. This could be performed on a real-time basis or during select intervals and periods. In other embodiments, additional circuitry, not shown in FIG. 2, may be provided to allow select intermediate read channel signals to be selected and analyzed by DSP 26. For example, the U.S. Provisional Patent Application entitled Waveform Sampler and Method for Sampling a Signal From a Read Channel, Ser. No. 60/013,094, provides a circuitry and method of accessing intermediate read channel signals from a read channel.

As mentioned above, some or all of the various circuit modules or elements of read channel 34 may receive read channel parameters for enhanced or optimal circuitry performance. The parameters are generally calculated during burn-in but may be calculated at other times, such as during real-time operation or while optimizing server hard disk drive 10. The read channel parameters may be designed to account for the various physical and magnetic characteristics of the storage media of disk/head assembly 14 that normally vary from system to system and affect system performance. The various physical and magnetic characteristics also generally change or degrade with use and time and thus the circuitry parameters must be recalculated, at least periodically, to further optimize system performance.

In one embodiment, parameter memory 35 is provided as a volatile memory and the read channel parameters are calculated during start-up and stored in parameter memory 35. In other embodiments, the read channel parameters are calculated during burn-in or other times and stored in non-volatile memory such as ROM 28 or parameter memory 35. When stored in ROM 28, the read channel parameters may be communicated through bus 22 to read channel 34 during start-up.

Thus, it is apparent that there has been provided, in accordance with the present invention, a server hard disk drive integrated circuit and method that satisfies the advantages as set forth above. Although the present invention has been described in detail, it should be understood that a multiplicity of changes, substitutions, and alterations can be made herein without departing from the scope of the present invention. For example, a variety of different techniques and alternative circuitry could be used in read channel 34 while still achieving the desired functionality of the present invention. Also, the direct connections illustrated herein could be altered by one skilled in the art such that two devices are merely coupled to one another through an intermediate device or devices without being directly connected while still achieving the desired results demonstrated by the present invention. For example, server hard disk drive integrated circuit 12 may be used to control the operation and exchange of digital data between client 20 and any storage media even though other devices or elements are coupled between server hard disk drive integrated circuit 12 and client 20 or between server hard disk drive integrated circuit 12 and the storage media. Other examples of changes, substitutions, and alterations are readily ascertainable by one skilled in the art and could be made without departing from the spirit and scope of the present invention as defined by the following claims.

What is claimed is:

1. A server hard disk drive system for controlling the operation of a server hard disk drive and for processing digital data exchanged between a plurality of clients and a storage media of the server hard disk drive, the storage media for storing computer files and including a spindle motor for rotating a magnetic disk and a head actuator for positioning a read/write head, the server hard disk drive integrated circuit comprising:

a data memory operable to store the digital data;

a disk control circuitry operable to operate as a network node to receive and store requests from the plurality of clients and to exchange digital data with the plurality of clients, the disk control circuitry operable to control the storage of the digital data in the data memory;

the plurality of clients being coupled to the disk control circuitry;

a write channel operable to receive and process an inbound digital data signal provided from the data memory during a write operation and to generate a write signal in response that is communicated to the storage media;

a read channel operable to receive and process a read signal from the storage media during a read operation and to generate an outbound digital data signal in response, the read channel operable to generate an intermediate read signal while processing the read signal;

a servo circuit operable to receive and process a servo wedge signal from the storage media during a servo operation and to generate a servo signal in response;

a motor control circuit operable to receive a motor control input signal and to generate a motor control output signal to control the spindle motor and the head actuator; and a digital signal processor operable to initiate read and write operations as needed to perform the requests provided from the plurality of clients, the digital signal processor operable to perform file management and to generate the motor control input signal in response to receiving the servo signal, the digital signal processor further operable to process the intermediate read signal to generate a read channel parameter.

2. The server hard disk drive system of claim 1, wherein the disk control circuitry couples with the plurality of clients through a network connection.

3. The server hard disk drive system of claim 1, wherein the disk control circuitry interfaces with the plurality of clients through a 1394 data transport bus and the exchange of information between the disk control circuitry and the plurality of clients is controlled by the digital signal processor.

4. The server hard disk drive system of claim 1, wherein the disk control circuitry interfaces with the plurality of clients through a Universal Serial Bus and the exchange of information between the disk control circuitry and the plurality of clients is controlled by the digital signal processor.

5. The server hard disk drive system of claim 1, wherein the interface between the disk control circuitry and the plurality of clients is configurable so that the disk control circuitry may interface with the plurality of clients using any one of a plurality of interface formats.

6. The server hard disk drive system of claim 1, wherein the servo signal includes position error information and track identification information.

7. The server hard disk drive system of claim 1, wherein the servo circuit generates the servo signal in the analog domain and further comprising:

an analog-to-digital converter operable to convert the servo signal from the analog domain to the digital domain.

8. The server hard disk drive system of claim 1, wherein the read channel is operable to receive the read channel parameter from the digital signal processor and to use the read channel parameter to generate the outbound digital data signal.

9. The server hard disk drive system of claim 8, wherein the digital signal processor performs adaptive filtering using the intermediate read signal to generate the read channel parameter as a filter coefficient.

10. The server hard disk drive system of claim 8, wherein the read channel parameter is the coefficient for a finite impulse response filter of the read channel.

11. The server hard disk drive system of claim 1, wherein the digital signal processor is responsive to one or more stored routines and further comprising:

a processor memory operable to store processor instructions that include the one or more stored routines.

12. The server hard disk drive system of claim 1, wherein the motor control output signal is provided to a power driver of the storage media to control the spindle motor and the head actuator.

13. The server hard disk drive system of claim 1, further comprising:

a parameter memory for storing the read channel parameter generated by the digital signal processor.

14. The server hard disk drive system of claim 1, wherein the disk control circuitry is operable to perform bus arbitration to control access to an internal bus of the server hard disk drive system.

15. The server hard disk drive system of claim 1, wherein the read channel uses discrete time signal processing.

16. The server hard disk drive system of claim 1, wherein the read channel includes:

a variable gain amplifier for amplifying the read signal and generating an amplified read signal;

a continuous-time filter for filtering the amplified read signal to generate a filtered read signal;

a sampler operable to sample the filtered read signal to generate a discrete read signal;

a discrete-time signal equalizer operable to equalize the discrete read signal to generate an equalized read signal; and a detector operable to analyze the equalized read signal to generate the outbound digital signal.

17. The server hard disk drive system of claim 16, wherein the sampler of the read channel is an analog-to-digital converter and the discrete-time signal equalizer is a digital filter operable to filter the discrete read signal to generate the equalized read signal.

18. A server hard disk drive for storing computer files provided from a plurality of clients, the server hard disk drive comprising:

a storage media including:

a magnetic disk operable to magnetically store computer files, a spindle motor operable to rotate the magnetic disk, a read/write head operable to read and write information to the magnetic disk, and a head actuator operable to position the read/write head; and a server hard disk drive integrated circuit including:

a data memory operable to store digital data, a disk control circuitry operable to function as a network node to receive and store requests from the plurality of clients and to exchange the digital data with the plurality of clients, the disk control circuitry operable to control the storage of the digital data in the data memory, the plurality of clients being coupled to the disk control circuitry, a write channel operable to receive and process an inbound digital data signal provided from the data memory during a write operation and to generate a write signal in response that is communicated to the storage media, a read channel operable to receive and process a read signal from the storage media during a read operation and to generate an outbound digital data signal in response, the read channel operable to generate an intermediate read signal while processing the read signal, a servo circuit operable to receive and process a servo wedge signal from the storage media during a servo operation and to generate a servo signal in response, a motor control circuit operable to receive a motor control input signal and to generate a motor control signal to control the spindle motor and the head actuator, and a digital signal processor operable to initiate read and write operations as needed to perform the requests provided from the plurality of clients, the digital signal processor operable to perform file management and to generate the motor control input signal in response to receiving the servo signal, the digital signal processor further operable to process the intermediate read signal to generate a read channel parameter.

* * * * *